US012634398B2

(12) United States Patent
Kedarisetti et al.

(10) Patent No.: US 12,634,398 B2
(45) Date of Patent: May 19, 2026

(54) METHOD OF GENERATING A TRIGGER INITIATING AN EMERGENCY INCIDENT RESPONSE WORKFLOW

(71) Applicant: MOTOROLA SOLUTIONS, INC., Chicago, IL (US)

(72) Inventors: Dharanish Kedarisetti, Woburn, MA (US); Emmy Beltre, Westchester, IL (US); Kaveh Malakuti, Savannah, GA (US); Mariya Bondareva, Loxahatchee, FL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 304 days.

(21) Appl. No.: 18/476,734

(22) Filed: Sep. 28, 2023

(65) Prior Publication Data

US 2025/0112995 A1 Apr. 3, 2025

(51) Int. Cl.
*H04M 11/04* (2006.01)
*G08B 25/00* (2006.01)

(52) U.S. Cl.
CPC ............. *H04M 11/04* (2013.01); *G08B 25/00* (2013.01); *H04M 11/045* (2013.01)

(58) Field of Classification Search
CPC ...... H04M 11/04; H04M 11/045; G08B 25/00
See application file for complete search history.

(56) References Cited

U.S. PATENT DOCUMENTS

| | | | |
|---|---|---|---|
| 10,354,169 B1 | 7/2019 | Law et al. | |
| 11,037,571 B2 | 6/2021 | Alcock et al. | |
| 11,395,124 B2 * | 7/2022 | Rohde et al. | ........... H04W 4/90 |
| 11,749,094 B2 * | 9/2023 | Pellegrini et al. | |
| 2012/0256745 A1 | 10/2012 | Piett et al. | |
| 2014/0078300 A1 | 3/2014 | Tine et al. | |
| 2014/0118543 A1 | 5/2014 | Kerbs et al. | |
| 2019/0197369 A1 | 6/2019 | Law et al. | |

(Continued)

OTHER PUBLICATIONS

ZEE: "Guides—Top 10 Transcription Tools and Software", https://web.archive.org/web/20240424222757/https://techround.co.uk/guides/top-transcription-tools-software/, Apr. 3, 2024, all pages.

(Continued)

*Primary Examiner* — Fan S Tsang

(57) ABSTRACT

A computer-implemented method of generating a trigger initiating an emergency incident response workflow and a device implementing the method is disclosed. Emergency notification data associated with at least one emergency notification reporting a first incident is received. Based on the emergency notification data, a first sensor data originating from one or more sensors is retrieved, the first sensor data associated with a time and location of the first incident. At least one alarm-escalating trigger is generated. The alarm escalating trigger comprises an alarm-escalating condition and a first-type emergency incident response workflow, the alarm-escalating condition being based on at least a portion of the first sensor data. The alarm-escalating trigger, when implemented by an implementing device, triggers the first-type emergency incident response workflow in response to receiving a second sensor data originating from one or more implementing sensors, the second sensor data meeting the alarm-escalating condition.

17 Claims, 3 Drawing Sheets

(56) References Cited

U.S. PATENT DOCUMENTS

| | | | |
|---|---|---|---|
| 2020/0288295 A1 | 9/2020 | Martin et al. | |
| 2021/0124741 A1 | 4/2021 | Acharya et al. | |
| 2023/0282371 A1* | 9/2023 | Meyerson | G16H 40/20 |
| | | | 705/2 |

OTHER PUBLICATIONS

ASTROPORMEAI: "Gemikni Pro API: Hey Gemini! Developing a Voice-Activated Multimodal AI App", Medium.com, https://medium.com/@astropomeai/gemini-pro-api-hey-gemini-developing-a-voice-activated-multimodal-ai-app-6cbe48215bc1, Dec. 27, 2023, all pages.

* cited by examiner

METHOD OF GENERATING A TRIGGER INITIATING AN EMERGENCY INCIDENT RESPONSE WORKFLOW

BACKGROUND OF THE INVENTION

Members of the public, encountering public safety incidents such as traffic accidents, structure fires, crimes or other law enforcement events, natural disasters, and the like, may seek emergency assistance by calling 9-1-1 using wireless communications devices. Calls to 9-1-1 are routed to public safety answering points (PSAPs), where the calls are answered by call takers. PSAP call takers engage emergency callers to gather information and dispatch public safety personnel and resources to respond to the public safety incidents.

However, in some cases an incident is not immediately followed by a 911 call due to various reasons. For instance, there are no witnesses who can immediately report an emergency because they are helping victims (e.g., making a CPR) or are looking for a safe place. Precious moments for the first responders are lost because of such delays.

A variety of systems and devices, e.g. surveillance systems and alarm devices, may trigger an alarm and/or notify a public safety agency after event detection. These systems and devices have to be pre-programmed for particular event types. As a result, they may omit the events that were not predefined.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
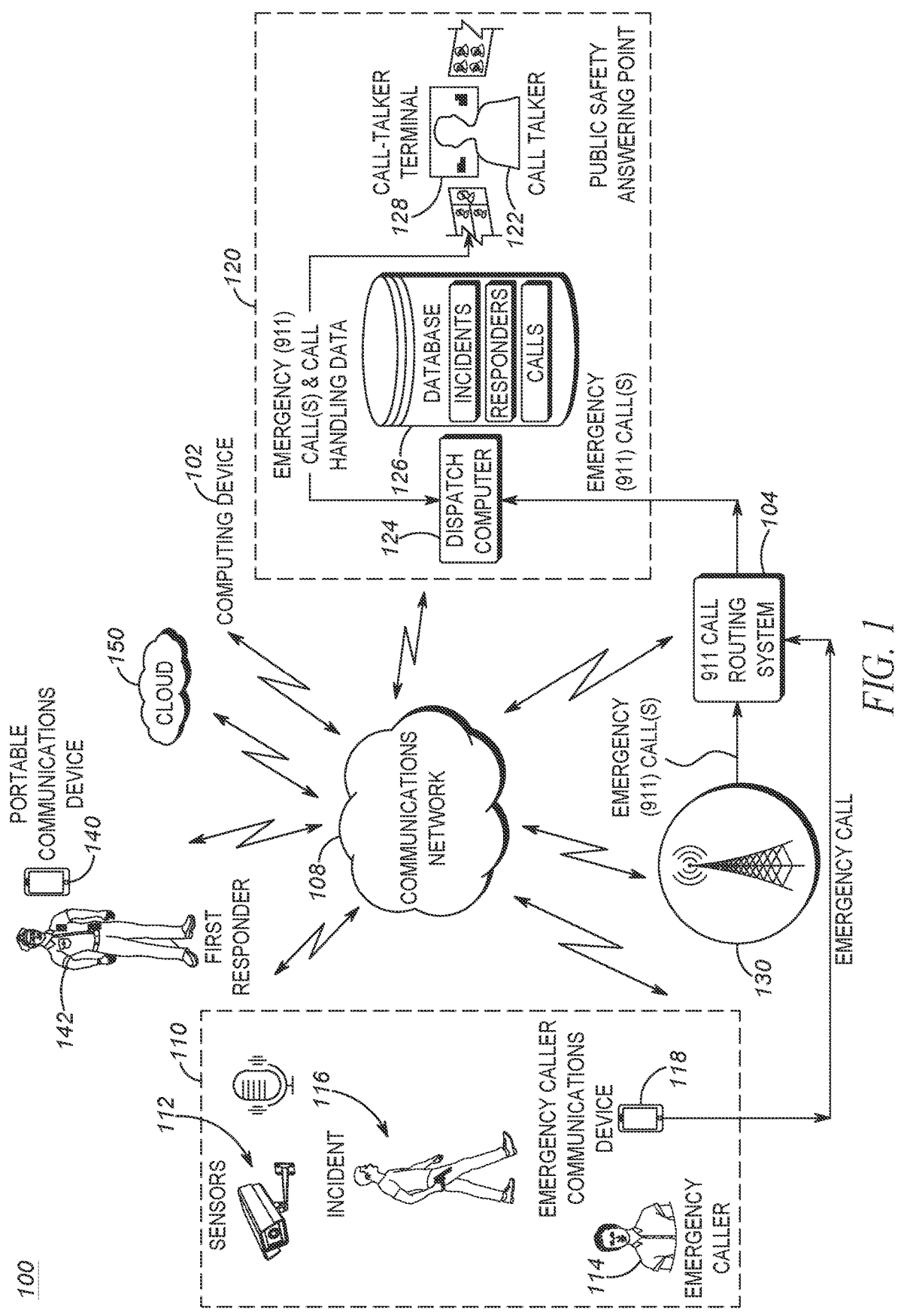
FIG. 1 is a system diagram illustrating a public-safety communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

To address the above-mentioned problem, a method, a computing device, and non-transitory, computer-readable storage medium for generating a trigger initiating an emergency incident response workflow are provided herein.

A first aspect of the present invention provides a computing device for generating a trigger initiating an emergency incident response workflow, comprising a communication unit and a controller configured to:

receive emergency notification data associated with at least one emergency notification reporting a first incident;

retrieve, based on the emergency notification data, a first sensor data originating from one or more sensors, the first sensor data associated with a time and location of the first incident; and generate at least one alarm-escalating trigger comprising an alarm-escalating condition and a first-type emergency incident response workflow, the alarm-escalating condition being based on at least a portion of the first sensor data, wherein the alarm-escalating trigger when implemented by an implementing device triggers the first-type emergency incident response workflow in response to receiving a second sensor data originating from one or more implementing sensors, the second sensor data meeting the alarm-escalating condition.

A second aspect of the present invention is a method of generating a trigger initiating an emergency incident response workflow comprising:

receiving, at a computing device, emergency notification data associated with at least one emergency notification reporting a first incident;

retrieving, by the computing device, based on the emergency notification data, a first sensor data originating from one or more sensors, the first sensor data associated with a time and location of the first incident; and generating, at the computing device, at least one alarm-escalating trigger comprising an alarm-escalating condition and a first-type emergency incident response workflow, the alarm-escalating condition being based on at least a portion of the first sensor data, wherein the alarm-escalating trigger when implemented by an implementing device triggers the first-type emergency incident response workflow in response to receiving a second sensor data originating from one or more implementing sensors, the second sensor data meeting the alarm-escalating condition.

A third aspect of the present invention is a non-transitory, computer-readable storage medium having program instructions stored thereon that, when executed by one or more processors, enable the one or more processors to implement the method of generating a trigger initiating an emergency incident response workflow.

Turning now to the drawings, wherein numerals designate like components, FIG. 1 illustrates an exemplary operational environment for the present invention, a public-safety communication system 100.

FIG. 1 shows one example of a networked configuration, in which embodiments may be implemented. Other configurations are possible. In the example shown, the system 100 includes a 911 call routing system 104, the sensors 112 and a public safety answering point (PSAP) 120. It should be understood that the system 100 is provided as one example and, in some embodiments, the system 100 may include fewer or additional components. As would be understood by one skilled in the art, FIG. 1 is a simplified diagram. Networks may be more complex than the schematic elements depicted in FIG. 1.

The 911 call routing system 104, sensors 112, and PSAP 120 are communicatively coupled to one another via a communications network 108. The communications network 108 is a communications network including wireless connections, wired connections, or combinations of both. The communications network 108 may be implemented using a wide area network, for example, the Internet (including public and private IP networks), a Long Term Evolution (LTE) network, a Global System for Mobile Communications (or Groupe Spécial Mobile (GSM)) network, a Code Division Multiple Access (CDMA) network, an Evolution-Data Optimized (EV-DO) network, an Enhanced Data Rates for Global Evolution (EDGE) network, a 3G network, a 4G network, 5G network and one or more local area networks, for example, a Bluetooth™ network or Wi-Fi network, and/or combinations or derivatives thereof.

The public-safety communication system 100 may have access to a cloud computing infrastructure 150. Cloud computing infrastructures are offered by the cloud providers to provide different services, for example, data storage, a communication application configured to process and/or conduct and/or manage a call between communication devices or a camera image analysis application configured to perform a face recognition procedure. Hereafter, the cloud computing infrastructure 150 will be interchangeably referred to as the cloud 150. System 100 may also include more cloud computing infrastructures.

The call routing system 104 is configured to receive emergency calls from citizens. For example, an emergency caller 114 (e.g., a citizen) encountering an incident 116 at an incident location 110 may place an emergency call (for example, by dialing 9-1-1) using an emergency caller communications device 118.

In some embodiments, the emergency caller communications device 118 is a portable communications device including hardware and software configured to communicate via the cellular network 130. The emergency caller communications device 118 may be, for example, a smart telephone, a mobile two-way radio, a smart watch, a laptop computer, a tablet computer, or another similar device capable of operating as described herein.

The cellular network 130 may operate according to an industry standard cellular protocol, for example, the Long Term Evolution (LTE) (including LTE-Advanced or LTE-Advanced Pro compliant with, for example, the 3GPP TS 36 specification series), or the 5G standard (including a network architecture compliant with, for example, the 3GPP TS 23 specification series and a new radio (NR) air interface compliant with the 3GPP TS 38 specification series), among other possibilities, and over which, among other things, an open mobile alliance (OMA) push to talk (PTT) over cellular (OMA-PoC), a voice over IP (VoIP), or a PTT over IP (PoIP) application may be implemented.

An emergency call placed via the cellular network 130 is routed to the 911 call routing system 104. In FIG. 1, the 911 call routing system 104 represents the hardware and telecommunications infrastructure of a 911 system. The 911 call routing system 104 may include aspects of an Enhanced 911 (E911) system, a Next Generation 911 (NG911) system, or both. The 911 call routing system 104 operates to receive emergency calls placed by, among others, subscribers of the cellular network 130 and route those calls to a public safety answering point (PSAP) (for example, the PSAP 120). The 911 call routing system 104 chooses a PSAP for an emergency call based on the caller's current location (for example, as determined using a geolocation system contained in the emergency caller communications device 118).

Embodiments described herein are not limited in their application to emergency calls placed via cellular networks and may apply to emergency calls placed using landlines (e.g., the public switched telephone network, IP phones, satellite phones, and the like) or through other means. In some embodiments, emergency calls may be placed automatically by, among other things, an Internet of Things (IoT) device.

The PSAP 120 includes a dispatch computer 124, a database 126, and a call taking terminal 128. The dispatch computer 124, database 126, and call-taking terminal 128 are communicatively coupled using one or more wired and/or wireless networks (not shown). A call taker 122 interacts with the call-taking terminal 128 to answer communications, including emergency calls, received at the PSAP 120 and access and modify data stored in the database 126. The PSAP 120 performs computer aided dispatch (CAD) operations for law enforcement and other emergency services. Computer aided dispatch operations are known and will not be described in detail. In some embodiments, call taker 122 may be an automated artificial intelligence (AI) bot or tool that may leverage natural language processing (NLP), voice to text, and/or text to voice technologies, and the like.

Communications received at the PSAP 120 include voice communications, for example, emergency calls received via the cellular network 130 and the 911 call routing system 104. In some embodiments, the PSAP 120 sends and receives other types of voice communications, including, for example, two-way radio communications, using same or other communications networks (not shown) or notifications from other systems. Communications received at the PSAP 120 may also include data communications, including, for example, short message service (SMS) messages and multimedia message service (MMS) messages (collectively referred to herein as "text messages"), email messages, pages, instant messages, and the like.

The dispatch computer 124 includes, among other things, a processor (for example, a microprocessor or another suitable programmable device), a memory (i.e., a computer-readable storage medium), an input/output interface (not shown), and various other hardware and software components for performing computer aided dispatch, call control, and other operations at a PSAP.

The dispatch computer 124 is communicatively coupled to the call-taking terminal 128, which includes one or more input devices, output devices, or input and output devices including, for example, one or more displays, keyboards, keypads, mice, joysticks, touchscreens, speakers, microphones, and headsets. The dispatch computer 124 receives input from and provides output (including emergency calls) to the call taker 122 through the call-taking terminal 128. The dispatch computer 124 and the call-taking terminal 128 are capable of controlling call handling hardware and software (not shown) to originate and terminate voice calls (for example, emergency calls), text message communications, and other forms of electronic communication either alone, or by interfacing with network equipment (not shown) in the communications network 108 and other communications networks.

The dispatch computer 124 is communicatively coupled to, and writes data to and from, the database 126. As illustrated in FIG. 1, the database 126 may be a database housed on a suitable database server communicatively coupled to and accessible by the dispatch computer 124 and the call routing computing device 102.

In alternative embodiments, the database 126 may be part of a cloud-based database system (for example part of the cloud 150) and accessible by other components of the system 100 over one or more wired and/or wireless networks. In some embodiments, all or part of the database 126 may be locally stored on the dispatch computer 124.

For example, the dispatch computer 124 may use data stored in the database 126 to dispatch in field first responders and other personnel to respond to incidents. The data may be received from members of the public and first responders (for example, the emergency caller 114 and a first responder 142 equipped with a portable communications device 140), and other sources. In some embodiments the database 126 electronically stores incident data, responder data, and call data.

Incident data refers to incident records for public safety incidents. An incident record is a data structure within the database 126, which contains information regarding a public safety incident, stored in a particular sequence and format. In some embodiments, the database 126 stores the incident data in a CAD incident database. As used herein, the terms "incident" and "public safety incident" refer to situations requiring the attention of one or more public safety agencies to protect the public and keep the public safe. In one example, an incident is a crime in progress, such as a bank robbery. In other examples, an incident is the response to a call for service, for example, responding to a traffic accident, searching for a suspect, locating a missing person, responding to a fire, responding to a medical emergency, investigating a past incident, and the like. The incident data for a given incident may include an incident type (for example, a crime, a fire, a medical emergency, a natural disaster, a traffic stop, and the like), an incident identifier (for example, a unique alphanumeric code that identifies the incident record within a computer-aided dispatch system), call identifiers identifying emergency and non-emergency calls received related to the incident, and the like.

Examples of responder data include responder identifiers (for example, name, rank, agency, assignment, and the like), an active incident assignment for a responder, a responder role (for example, identifying a supervisory role or an area of operation overall or within the incident), a responder location, and responder equipment data (for example, model, configuration, and responder assignment information for portable communications devices).

Call data includes data for calls, including emergency calls, routed to the PSAP 120 or to in-field first responders in lieu of the PSAP 120. Examples of call data include a call identifier (for example, a unique alphanumeric code that identifies the call record within a CAD system), an incident assignment associating the call with an incident, a location from which the call was placed, a caller identifier identifying the caller that placed the call, and the like.

The call taker 122 may be a dispatcher trained to handle incident communications. For example, within a next generation 911 system, the call taker 122 may be a public safety dispatcher trained to handle emergency communications. As noted above, these communications can include voice communications (for example, voice calls) and/or data communications (for example, text messages, email messages, pages, and the like). Based on the received communications, the call taker 122 may manually dispatch the appropriate services to handle incidents reported by individuals. Alternatively, or in addition, the dispatch computer 124 may be configured to automatically dispatch appropriate services. The dispatch computer 124 and the call-taking terminal 128 may also receive data input from the call taker 122, which is saved to the database 126. Generally, regardless of how or when an individual communicates with the PSAP 120 about an incident, information about the communication is stored in the database 126.

FIG. 1 shows sensors 112, for example cameras and audio sensors, that can be part of a public-safety system or a surveillance system. The sensors 112 may collect the data in real-time and store the data or transmit the data to other parts of the system, for example the cloud 150 and/or PSAP 120.

The public-safety communication system 100 may further include computing device 102 that is in communication with the communication network 108. Although depicted as a separate device, some or all of the computing device 102 functionality described herein can be also a part of the PSAP 120 (for example the dispatch computer 124), the 911 call routing system, the communication network 108, the cloud 150, one of the sensors 112 or any kind of infrastructure associated with the sensors 112, or may be placed at other locations. Regardless of location and/or configuration, the computing device 102 is generally configured to perform the method of generating a trigger initiating an emergency incident response workflow.

Figure 2:
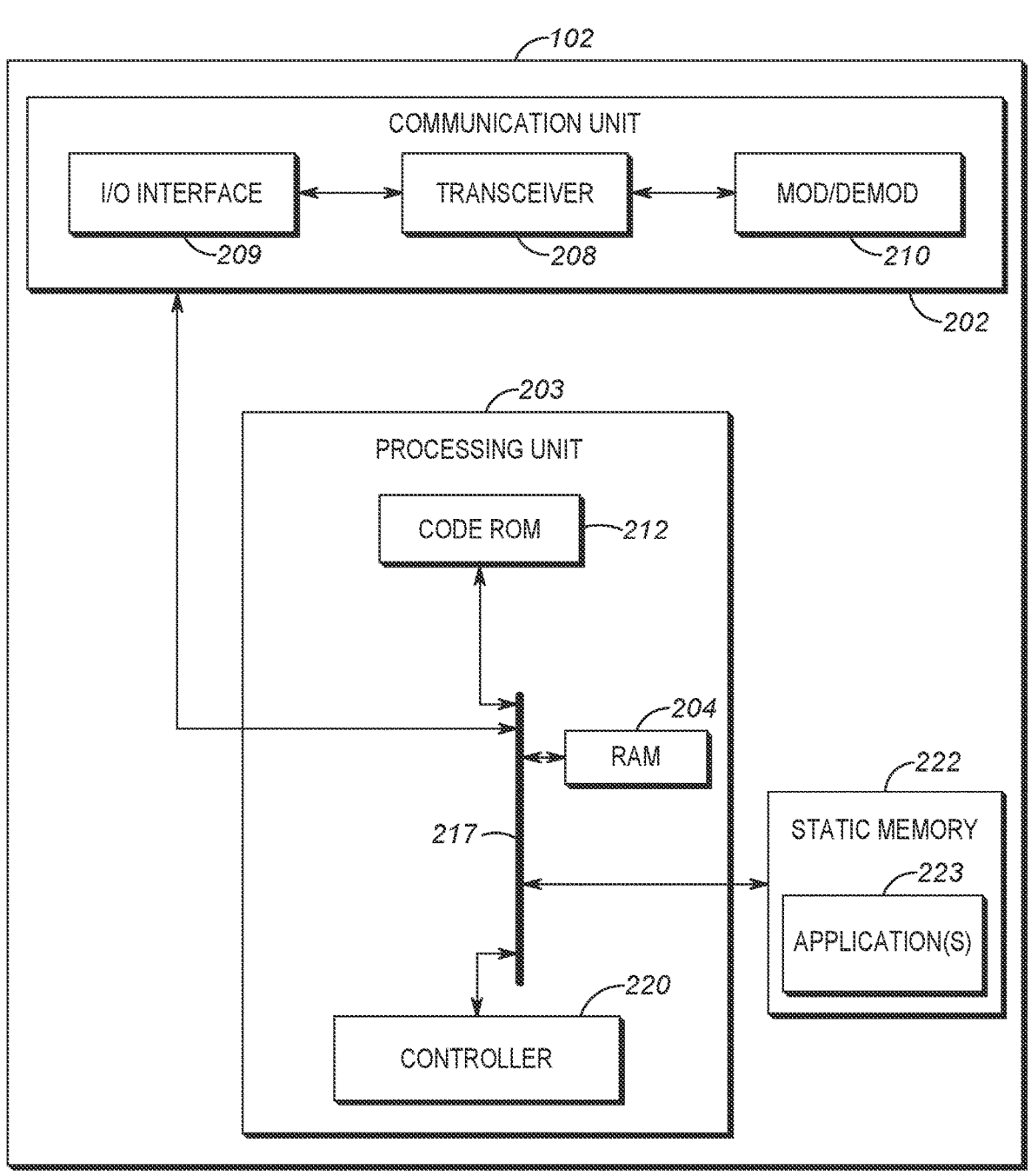
FIG. 2 is a device diagram showing a device structure of a computing device for generating a trigger initiating an emergency incident response workflow in accordance with some embodiments.

FIG. 2 schematically illustrates one embodiment of the computing device 102.

As shown in FIG. 2, the computing device 102 includes the communication unit 202 communicatively coupled to the common data and address bus 217 of the processing unit 203. The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 which are configurable to communicate with at the communication network 108 and/or parts of the network (for example the PSAP 120). For example, the communication unit 202 may include one or more transceivers 208 and/or wireless transceivers for communicating with the communication network 108 and the PSAP 120. The one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may optionally include one or more wireline transceivers 208, such as an Ethernet transceiver, a USB (Universal Serial Bus) transceiver, or a similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g., hardware ports) for coupling to other hardware components.

The controller 220 may include one or more logic circuits, one or more processors, one or more microprocessors, and/or the controller 220 may include one or more ASIC (application-specific integrated circuits) and one or more FPGA (field-programmable gate arrays), and/or another electronic device. In some examples, the controller 220 and/or the computing device 102 is not a generic controller and/or a generic device, but a device specifically configured to implement functionality for executing the cloud services in a cloud environment. For example, in some examples, the computing device 102 and/or the controller 220 specifically comprises a computer-executable engine configured to implement functionality for generating a trigger initiating an emergency incident response workflow in a cloud environment.

The static memory 222 is a non-transitory machine-readable medium that stores machine-readable instructions to implement one or more programs or applications. Example machine-readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine-readable instructions) that implement some or all of the functional teachings of the computing device 102 as described herein are maintained, persistently, at the memory 222 and used by the controller 220 which makes appropriate utilization of volatile storage during the execution of such programming instructions.

Figure 3:
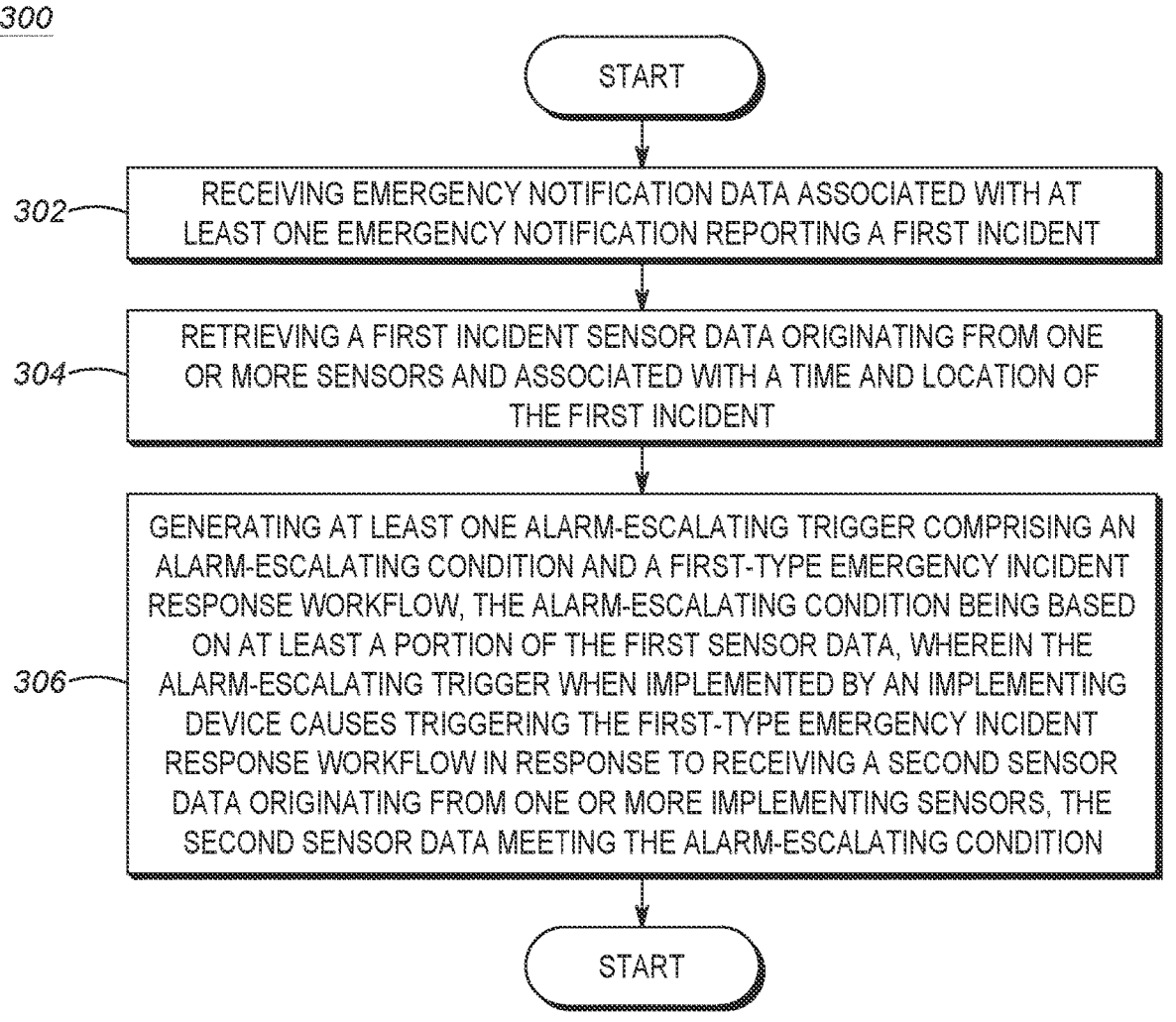
FIG. 3 is a flowchart of a method of generating a trigger initiating an emergency incident response workflow in accordance with some embodiments.

In particular, the memory 222 stores instructions corresponding to the at least one application 223 that, when executed by the controller 220, enable the controller 220 to implement functionality for generating a trigger initiating an emergency incident response workflow, but not limited to, one or more of the blocks of the method outlined in FIG. 3.

In one illustrated example, when the controller 220 executes the application 223, the controller 220 is enabled to:

> receive emergency notification data associated with at least one emergency notification reporting a first incident,
>
> retrieve, based on the emergency notification data, a first sensor data originating from one or more sensors, the first sensor data associated with a time and location of the first incident
>
> generate at least one alarm-escalating trigger comprising an alarm-escalating condition and a first-type emergency incident response workflow, the alarm-escalating condition being based on at least a portion of the first sensor data, wherein the alarm-escalating trigger when implemented by an implementing device causes triggering the first-type emergency incident response workflow in response to receiving a second sensor data originating from one or more implementing sensors, the second sensor data meeting the alarm-escalating condition.

Moreover, an embodiment can be implemented as a non-transitory, computer-readable storage medium having program instructions stored thereon that when executed by the controller 220, enables the controller 220 to implement the functionality of generating a trigger initiating an emergency incident response workflow.

Attention is now directed to FIG. 3, which depicts a flowchart representative of a process 300 of generating a trigger initiating an emergency incident response workflow. The operations of process 300 of FIG. 3 correspond to machine-readable instructions that are executed by computing device 102, and specifically the controller 220 of the computing device 102. In the illustrated example, the instructions represented by the blocks of FIG. 3 are stored in the memory 222 for example, as the application 223. Process 300 of FIG. 3 is one way, among others, in which the controller 220 and/or the computing device 102 and/or the system 100 may be configured.

Process 300 of FIG. 3 need not be performed in the exact sequence as shown and likewise, various blocks may be performed in parallel rather than in sequence. Accordingly, the elements of method 300 are referred to herein as "blocks" rather than "steps." Process 300 of FIG. 3 may be implemented on variations of the system 100 of FIG. 1, as well.

At block 302 the controller 220 and/or the computing device 102 receive, via the communication unit 202, emergency notification data associated with at least one emergency notification reporting a first incident.

The emergency notification reporting a first incident may be for example one or more of: an emergency call, a tip submit, a panic button notification, a notification from a first responder, and a notification from an IoT device. Emergency call may be placed by dialing 9-1-1, but it can also be any other call reporting incident to an administrator of a facility or other authorities.

The first incident may be a public safety incident (for example, shooting, assault) or a medical emergency (for example, faint). In some embodiments, when the method is implemented in a facility, the first incident may be for example, a malfunction of a machine.

Emergency notification data may be any type of data associated with at least one emergency notification reporting the first incident, including data regarding the call, the caller, the incident, etc. Emergency notification data may be collected automatically by the 911 call routing system 104 or PSAP 120 or any other part of the system 100, provided by the caller 114 or the first responder 142 reporting the incident 116, or entered by the call taker 122 through the call-taking terminal 128. Data associated with the incident may be any data collected by the system, provided to the system or generated by the system in connection with the incident, including data regarding response to the incident and may comprise one or more of: a type of the incident, a geographical location of the incident, a time at which the incident occurred, the agencies assigned to the incident, a type and/or a number of responders assigned to the incident, a number of participants who participated in the incident, a type and/or a number of devices assigned to the incident, and an action taken in response to the incident.

At block 304 the controller 320 and/or the computing device 102 retrieves a first sensor data originating from one or more sensors. The first sensor data may be associated with a time and location of the first incident based on the emergency notification data.

The first sensor data may be data from one sensor (for example, camera), multiple sensors of the same type (for example, an array of audio sensors) or a set of different sensors (for example, data from camera and an array of smart building sensors including access control points' sensors).

The first incident sensor data may be one or more of: video, audio, metadata, smart building sensor data, and access control data.

The first sensor data associated with the time and location of the first incident may include the data captured not only during the first incident, but also in a timeframe preceding the incident and/or following the first incident.

The sensor 112 may be some distance away from the incident location 110 and still be able to capture the data originating from the first incident 116. Said distance depends on a type of data, type of sensor, surroundings, and many other circumstances. Therefore, the data associated with the location of the incident does not necessarily mean that the data was collected by the sensors at the incident location 110 or in a very close proximity. For example audio sensor collecting the data associated the location of the incident may be within 50 meters, 250 meters or 500 meters of the incident location, nonzoomable video within 50 meters, 250 meters or 500 meters of the incident location, zoomable video within 500 meters, 1,000 meters, or 3,000 meters of the incident location (for zoomable cameras distance to incident location may depend on a zoom level).

In some cases the incident location 110 does not match the location of caller 114 or the time of the incident does not match the time of call, as the caller may place the call for example after fleeing the scene to safety. In such cases the first sensor data associated with the time and location of the first incident are retrieved based on the time and location of the incident provided by the caller 114, rather the based on the time of the call and/or location of the caller.

In some embodiments the controller 320 and/or the computing device 102 receives data from one or more sensors 112 on a regular or periodic basis. In such cases the step of retrieving the first sensor data originating from one or more sensors may include identifying, based on the emergency notification data, data from at least one sensor that could collect data originating from the first incident and a proper timeframe associated with the incident time.

The first sensor data may also be received in response to a request sent to the one or more sensors, the request being sent in response to receiving the emergency notification data. For example, the PSAP 120 may identify the sensor 112 that could collect data originating from the incident location 110 (for example a camera having at least part of the incident location within its field of view or the smart building sensors of a building that is the incident location) based on the location of the incident 116 retrieved from emergency notification data. A notification about the incident time may be transmitted to the sensor 112. Based on the received incident time the sensor may identify the first sensor data, that is the data collected within a certain timeframe associated with the incident time. Based on the identified data the alarm-escalating trigger is generated and implemented by the sensor. The alarm-escalating trigger may be shared with other sensor of the same or similar type.

In some embodiments, the proper timeframe associated with the incident time is predefined. The proper timeframe may depend for example on a type of the first incident, accuracy of determining the time of the first incident by a reporting person, etc. In other embodiments, the proper timeframe is determined based on the analysis of data from the sensors. The data from the sensors from a first predefined period is retrieved (for example data within a range <60 seconds before the first incident time; 60 seconds after the first incident time, or <30 minutes before the first incident time; 15 minutes after the first incident time>) and analyzed to detect an anomaly, for example parameter anomaly and/or abnormal behavior, unusual reading, unrecognizable object and/or sound, etc. The time of occurrence of this anomaly is then recognized as the proper timeframe and the sensor data within the proper timeframe is recognized as the first sensor data associated with the time of the first incident. Such analysis can be performed for example by the computing device 102 or the sensor 112.

At block 306 the controller 220 and/or the computing device 102 generates at least one alarm-escalating trigger comprising an alarm-escalating condition and a first-type response workflow. The alarm-escalating condition is based on at least a portion of the first sensor data. The alarm-escalating trigger, when implemented by an implementing computing device, triggers the first-type emergency incident response workflow in response to receiving a second sensor data originating from one or more implementing sensors, the second incident sensor data meeting the alarm-escalating condition.

The alarm escalating condition is a rule or a set of rules defining the sensor readings (originating from the same or similar sensor) that are similar enough to the first sensor data (associated with the time and location of the first incident) to indicate high probability of similar incident such that it should trigger the first type emergency incident workflow.

In other words, the first sensor data is associated with the first incident based on the time and the location of the incident extracted from the emergency notification data. If certain sensor readings were associated with the incident that triggered the emergency call, then reappearing of such or similar sensor readings indicates that the probability of the similar incident occurrence is high (or at least relatively higher than without). Therefore, reappearance of sensor readings the same or similar to those collected during the first incident may be a condition to trigger a predefined emergency incident response workflow. Hence, during a second incident a proper response may be initiated before (or even without) any emergency notification from a witness.

Definition of similarity between the first data and the second data may vary depending on the type of the sensor data. In some embodiments a similarity metric for the first sensor data and the second sensor data may be calculated and the alarm escalating condition may be defined as a threshold or a range.

For example, the first sensor data is a first video. In case of video data an image recognition software can be utilized to generate a text summary of the portions of the video (for example a set of frames) that are of interest. A text summary is a textual description of the contents of a video frame. The video summary may be, for example, a set of words. Therefore, a first text summary may be prepared for the first video, for example, the set of words {explosion, fire, car, people, scream}, and a second text summary may be prepared for a second video, being the second sensor data. The similarity metric for the first video and a second video may be defined as a number of words that appear in both, the first text summary and the second text summary. The predefined threshold maybe for example "4 words". The alarm-escalating condition is therefore defined as: "the second text summary comprises at least 4 words from: {explosion, fire, car, people, scream}". The first type emergency incident workflow is therefore triggered upon receiving the second video having the second text summary comprising at least 4 words from the set of words {explosion, fire, car, people, scream}.

In other example, a video captioning software can be utilized to generate the text summary of the portions of the video. A language model can be trained to establish if the summaries of two videos are similar: encoded summary representations are compared and classified as similar (type 1) or not similar (type 0). The first type emergency incident workflow is therefore triggered upon receiving the second video having the second text summary classified as type 1.

The direct classification into similar and not similar types can be done for video, audio or other sensor inputs directly, in this case, a textual summary is not necessary.

The second summary depends on the number of frames taken into account while preparing the summary; therefore, the condition may comprise the information about a length of a timeframe taken into account. The length of a timeframe taken into account may be based on the first sensor data (for example <70% of X; 130% of X>, wherein X is the length of the timeframe of the first sensor data). For example if the length of the first video was 30 seconds, the condition may be "the second text summary is classified as type 1, the length of the second video is within a range <21 seconds; 39 seconds>". The length of the timeframe may be taken into account also for other types of sensor data and for other methods of determining similarity.

The first type emergency incident workflow is at least one action that is triggered by the implementing device in response to receiving the second sensor data meeting the alarm-escalating condition. The first type emergency incident workflow may be one or more of: sending notification to the first responder's 142 portable communications device 140, sending notification to a call taking terminal 128, and executing of at least one cloud service in the cloud computing infrastructure 150.

The implementing device is a computing device configured to implement the method of generating a trigger initiating an emergency incident response workflow according to the invention i.e. monitoring for the second sensor data meeting the alarm-escalating condition and triggering the first-type emergency incident response workflow in response to receiving the second sensor data meeting the alarm-escalating condition.

The implementing device may be the controller 220 and/or the computing device 102 or may be a separate device.

The computing device and/or the implementing device may be embodied within one or more of: the PSAP 120, the 911 call routing system 104, a remote security system, an edge device (for example the sensors 112), the cloud computing infrastructure 150, or may be distributed among multiple parts of the system. The computing device and the implementing device may be the same or different device. For example, generating the alarm escalating trigger may be performed by the PSAP 120, whereas monitoring for the second sensor data meeting the alarm-escalating condition can be performed on an edge device (the sensor that collected the first sensor data or any other sensor of the same or similar type). In some embodiments both, generating the alarm escalating trigger and monitoring for the second sensor data meeting the alarm-escalating condition, may be performed by the same device, for example the edge device (the sensors 112) or the cloud 150.

The process 300 may also be extended to include the step (not shown) of implementing the alarm-escalating trigger by the implementing device. The alarm escalating trigger generated at block 306 may be send to and implemented by the other PSAPs or other, similar sensors (for example sensors located at the same type of building, for example an office or a plant). In response to receiving the second sensor data originating from one or more implementing sensors (for example the smart building sensors located in a second office) and meeting the alarm-escalating condition (for example: temperature sensor detects a temperature above 50° C. and a sudden increase of the number of people leaving the building is detected by an access control systems or a camera) first-type emergency incident response workflow is triggered (a fire brigade is dispatched, the emergency doors are opened, the alarm sirens are activated).

The first sensor data and/or the emergency notification data may be used as a training input to a learning machine, trained to recognize the sensor readings that should trigger an action.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

The computer program instructions may also be loaded onto a computer or other programmable data processing apparatus that may be on or off-premises, or may be accessed via the cloud in any of a software as a service (Saas), platform as a service (PaaS), or infrastructure as a service (IaaS) architecture.

It is contemplated that any part of any aspect or embodiment discussed in this specification can be implemented or combined with any part of any other aspect or embodiment discussed in this specification.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations. To reiterate, those electronic processors and processing may be distributed.

What is claimed is:

1. A computing device for generating a trigger initiating an emergency incident response workflow comprising:
   a communication unit; and
   a controller configured to:
   receive emergency notification data associated with at least one emergency notification reporting a first incident;
   retrieve, based on the emergency notification data, a first sensor data originating from one or more sensors, the first sensor data associated with a time and location of the first incident; and
   generate at least one alarm-escalating trigger comprising an alarm-escalating condition and a first-type emergency incident response workflow, the alarm-escalating condition being based on at least a portion of the first sensor data, wherein the alarm-escalating trigger when implemented by an implementing device triggers the first-type emergency incident response workflow in response to receiving a second sensor data originating from one or more implementing sensors, the second sensor data meeting the alarm-escalating condition.

2. The computing device according to claim 1, wherein the computing device is one or more of: a public safety answering point (PSAP), a call routing system, a security system, an edge device, or a cloud computing infrastructure.

3. The computing device according to claim 1, wherein the computing device is further configured to implement the alarm-escalating trigger.

4. The computing device according to claim 1, wherein the first sensor data is retrieved by a request to the one or more sensors, the request being sent in response to receiving the emergency notification data.

5. The computing device according to claim 1, wherein the alarm-escalating condition is met when a similarity metric calculated for the first sensor data and the second sensor data exceeds a predefined threshold.

6. The computing device according to claim 1, wherein emergency notification reporting a first incident is one or more of: emergency call, tip submit, panic button notification, notification from a first responder, or notification from an Internet of Things (IoT) device.

7. The computing device according to claim 1, wherein the first incident sensor data is one or more of: video, audio, metadata, smart building sensor data, or access control data.

8. The computing device according to claim 1, further configured to:

provide at least a portion of the first sensor data or at least a portion of the emergency notification data as a training input to a learning machine.

9. A computer-implemented method of generating a trigger initiating an emergency incident response workflow comprising:

receiving, at a computing device, emergency notification data associated with at least one emergency notification reporting a first incident;

retrieving, by the computing device, based on the emergency notification data, a first sensor data originating from one or more sensors, the first sensor data associated with a time and location of the first incident; and generating, at the computing device, at least one alarm-escalating trigger comprising an alarm-escalating condition and a first-type emergency incident response workflow, the alarm-escalating condition being based on at least a portion of the first sensor data, wherein the alarm-escalating trigger when implemented by an implementing device triggers the first-type emergency incident response workflow in response to receiving a second sensor data originating from one or more implementing sensors, the second sensor data meeting the alarm-escalating condition.

10. The computer-implemented method according to claim 9, wherein the computing device is one or more of: a public safety answering point (PSAP), a call routing system, a security system, an edge device, or a cloud computing infrastructure.

11. The computer-implemented method according to claim 9, wherein the first sensor data is retrieved by a request to the one or more sensors, the request being sent in response to receiving the emergency notification data.

12. The computer-implemented method according to claim 9, wherein the alarm-escalating condition is met when a similarity metric calculated for the first sensor data and the second sensor data exceeds a predefined threshold.

13. The computer-implemented method according to claim 9, wherein the emergency notification reporting the first incident is one or more of: emergency call, tip submit, panic button notification, notification from a first responder, or notification from an Internet of Things (IoT) device.

14. The computer-implemented method according to claim 9, wherein the first sensor data is one or more of: video, audio, metadata, smart building sensor data, or access control data.

15. The computer-implemented method according to claim 9, further comprising:

providing at least a portion of the first sensor data or at least a portion of the emergency notification data as a training input to a learning machine.

16. The computer-implemented method according to claim 9, further comprising the step of implementing the alarm-escalating trigger by the implementing device.

17. A non-transitory, computer-readable storage medium having program instructions stored thereon that when executed by one or more processors cause the one or more processors to:

receive emergency notification data associated with at least one emergency notification reporting a first incident;

retrieve, based on the emergency notification data, a first sensor data originating from one or more sensors, the first sensor data associated with a time and location of the first incident; and generate at least one alarm-escalating trigger comprising an alarm-escalating condition and a first-type emergency incident response workflow, the alarm-escalating condition being based on at least a portion of the first sensor data, wherein the alarm-escalating trigger when implemented by an implementing device triggers the first-type emergency incident response workflow in response to receiving a second sensor data originating from one or more implementing sensors, the second sensor data meeting the alarm-escalating condition.

* * * * *